United States Patent
Brands et al.

(10) Patent No.: US 11,126,992 B2
(45) Date of Patent: Sep. 21, 2021

(54) METHOD FOR FACILITATING TRANSACTIONS, COMPUTER PROGRAM PRODUCT AND MOBILE DEVICE

(71) Applicant: NXP B.V., Eindhoven (NL)

(72) Inventors: Jan Brands, Eindhoven (NL); Friso Jedema, Eindhoven (NL); Piotr Polak, Eindhoven (NL); Timotheus van Roermund, Hamburg (DE)

(73) Assignee: NXP B.V., Eindhoven (NL)

( * ) Notice: Subject to any disclaimer, the term of this patent is extended or adjusted under 35 U.S.C. 154(b) by 671 days.

(21) Appl. No.: 14/724,748

(22) Filed: May 28, 2015

(65) Prior Publication Data
US 2015/0347779 A1 Dec. 3, 2015

(30) Foreign Application Priority Data
May 28, 2014 (EP) ..................... 14170315

(51) Int. Cl.
*G06Q 20/32* (2012.01)
*G09C 1/00* (2006.01)
(Continued)

(52) U.S. Cl.
CPC ......... *G06Q 20/322* (2013.01); *G06F 21/602* (2013.01); *G06Q 20/045* (2013.01);
(Continued)

(58) Field of Classification Search
CPC ............... G06Q 20/322; G06Q 20/045; G06Q 20/3226; G06Q 20/3278; G06Q 20/36; G06Q 20/3823; G06F 21/602; G09C 1/00; H04W 4/008; H04L 2209/16; H04L 2209/805
See application file for complete search history.

(56) References Cited

U.S. PATENT DOCUMENTS 6,611,620 B1 * 8/2003 Kobayashi ........... H04N 19/593
375/E7.265
7,184,550 B2 * 2/2007 Graunke ................ H04L 9/065
380/277

(Continued)

FOREIGN PATENT DOCUMENTS

WO 2014/011144 A1 1/2014

OTHER PUBLICATIONS

Palmer et al "Opportunities in White-Box Cryptography," IEEE, pp. 64-67 (Year: 2010).*
(Continued)

*Primary Examiner* — Luu T Pham
*Assistant Examiner* — James J Wilcox

(57) ABSTRACT

There is disclosed a method for facilitating transactions carried out by a mobile device, wherein: the mobile device executes a smart card application; the smart card application receives a cryptographic algorithm from a transaction server external to the mobile device; the smart card application further receives transaction data from said transaction server; the cryptographic algorithm encrypts said transaction data and stores the encrypted transaction data in a storage unit of the mobile device. Furthermore, a corresponding computer program product and a corresponding mobile device for carrying out transactions are disclosed.

12 Claims, 1 Drawing Sheet

(51) Int. Cl.
*G06Q 20/38* (2012.01)
*G06Q 20/36* (2012.01)
*G06Q 20/04* (2012.01)
*G06F 21/60* (2013.01)
*H04W 4/80* (2018.01)

(52) U.S. Cl.
CPC ..... *G06Q 20/3226* (2013.01); *G06Q 20/3278* (2013.01); *G06Q 20/36* (2013.01); *G06Q 20/3823* (2013.01); *G09C 1/00* (2013.01); *H04W 4/80* (2018.02); *H04L 2209/16* (2013.01); *H04L 2209/805* (2013.01)

(56) References Cited

U.S. PATENT DOCUMENTS

| | | | | |
|---|---|---|---|---|
| 8,983,873 | B2* | 3/2015 | Lund | G07F 7/1033 705/67 |
| 9,177,315 | B2* | 11/2015 | Pitroda | G06Q 20/322 |
| 10,032,171 | B2* | 7/2018 | Yeager | H04L 9/3234 |
| 10,068,223 | B1* | 9/2018 | Rezayee | G06Q 20/3278 |
| 10,733,594 | B1* | 8/2020 | Dai Zovi | G06K 9/00006 |
| 2001/0048025 | A1* | 12/2001 | Shinn | G07C 9/257 235/382 |
| 2002/0040936 | A1* | 4/2002 | Wentker | G06Q 20/3576 235/492 |
| 2004/0127256 | A1* | 7/2004 | Goldthwaite | G06Q 20/02 455/558 |
| 2005/0137889 | A1 | 6/2005 | Wheeler | |
| 2005/0195975 | A1* | 9/2005 | Kawakita | H04L 9/0825 380/30 |
| 2006/0090081 | A1* | 4/2006 | Baentsch | H04L 9/0625 713/189 |
| 2006/0256105 | A1 | 11/2006 | Scarlata et al. | |
| 2007/0241182 | A1* | 10/2007 | Buer | G06Q 20/40975 235/380 |
| 2008/0109372 | A1* | 5/2008 | Bykov | G06Q 20/3821 705/71 |
| 2008/0270578 | A1* | 10/2008 | Zhang | H04L 63/0807 709/219 |
| 2009/0083189 | A1* | 3/2009 | Bykov | G06Q 20/401 705/64 |
| 2009/0089869 | A1* | 4/2009 | Varghese | G06Q 20/4014 726/7 |
| 2010/0023747 | A1* | 1/2010 | Asnaashari | G06Q 20/3563 713/150 |
| 2010/0080395 | A1* | 4/2010 | Michiels | H04L 9/0631 380/278 |
| 2010/0115610 | A1* | 5/2010 | Tredoux | H04L 9/3231 726/19 |
| 2011/0099112 | A1* | 4/2011 | Mages | G06Q 20/12 705/64 |
| 2011/0161669 | A1* | 6/2011 | Eto | G06F 21/10 713/168 |
| 2011/0283002 | A1* | 11/2011 | King | H04L 29/08846 709/227 |
| 2012/0072731 | A1* | 3/2012 | Winograd | G09C 5/00 713/176 |
| 2012/0124658 | A1* | 5/2012 | Brudnicki | G06Q 20/204 726/9 |
| 2012/0170740 | A1 | 7/2012 | Lee et al. | |
| 2012/0185694 | A1* | 7/2012 | Munetoh | G06F 21/57 713/168 |
| 2013/0054474 | A1* | 2/2013 | Yeager | G06Q 20/02 705/71 |
| 2013/0061061 | A1* | 3/2013 | Farrugia | G09C 1/00 713/190 |
| 2013/0173316 | A1 | 7/2013 | Agrawal | |
| 2013/0281055 | A1* | 10/2013 | Patefield-Smith | G06F 21/602 455/411 |
| 2014/0013406 | A1 | 1/2014 | Tremlet | |
| 2014/0154979 | A1* | 6/2014 | Tomas | G06Q 20/3278 455/41.1 |
| 2014/0358777 | A1* | 12/2014 | Gueh | G06Q 20/1085 705/43 |
| 2015/0095223 | A1* | 4/2015 | Jimenez Alamo | G06Q 20/325 705/41 |
| 2016/0012465 | A1* | 1/2016 | Sharp | G06Q 20/386 705/14.17 |
| 2016/0307189 | A1* | 10/2016 | Zarakas | G06K 19/07722 |
| 2016/0330019 | A1* | 11/2016 | Michiels | H04L 9/14 |
| 2016/0350560 | A1* | 12/2016 | Hoogerbrugge | H04L 9/002 |
| 2018/0349913 | A1* | 12/2018 | Yeager | H04L 9/3234 |

OTHER PUBLICATIONS

Extended European Search Report for Patent Appln. No. 14175960.5 (dated Nov. 18, 2014).
"IOS: Using Passbook", Apple, 7 pgs, retrieved from the internet at: http://web.archive.org/web/20131112120326/http:/support.apple.com/kb/HT5483 (Sep. 24, 2013).
Office Action for EP counterpart patent application No. 14175960.5 (dated Mar. 17, 2017).
Office Action for CN counterpart patent application No. 201510249954.0 (dated Apr. 19, 2018).
National Institute of Standards and Technology: "Advanced Encryption Standard AES)". FIPS publication 197 http://csrc.nist.gov/publications/fips/fips197/fips-197.pdf (Nov. 2001).
Billet, O., "Cryptanalysis of a White Box AES Implementation", Proceedings of the 11th International Workshop on Selected Areas in Cryptography (SAC 2004), vol. 3357 of Lecture Notes in Computer Science, pp. 227-240. Springer-Verlag (Aug. 2004).
Chow, S., "White-box cryptography and an AES implementation". Proc. 9th International Workshop on Selected Areas in Cryptography (SAC 2002), pp. 250-270. Springer LN CS 2595 (Aug. 2003).
Collberg, C., "Surreptitious Software; Models from Biology and History", Print ISBN: 978-3-540-73985-2, Sep. 2012.
Daemen, J., "The block cipher Square," Fast Software Encryption, LNCS 1267, E. Biham, Ed., Springer-Verlag, pp. 149-165. Also available as http://www.esat.kuleuven.ac.be/rijmen/square/fse.ps.gz, May 2006.
Daemen, J., "The Rijndael Block Cipher", AES Proposal, Document version 2, Mar. 9, 1999.
De Mulder, Y., "Revisiting the BGE attack on a White-Box AES implementation", http://eprint.iacr.org/2013/450 on Selected Areas in Cryptography (SAC 2008), Lecture Notes in Computer Science. Springer-Verlag (Aug. 2013).
Gorrisen, P., "White-Box Cryptography", Philips Sense and Simplicity, Philips Research, Oct. 20, 2008; http://re-trust.dit.unitn.it/files/20081015Doc/session1-1-Gorissen-Michiels.pdf, Oct. 2008.
Michiels, W., "Cryptanalysis of a Generic Class of White-Box Implementations" Proceedings of the 15th International Work-shop, Aug. 2008.
Muir, J., "A tutorial on White-box AES, Advances in Network Analysis and its Applications", Mathematics in Industry 18, 209-229. See also: http://eprint.iacr.org/2013/104.pdf, Feb. 2013.
Plasmans, M., "White-box cryptography for Digital Content Protection", master thesis, Jun. 2005.
Wyseur, B., "Cryptanalysis of White-Box DES Implementations with Arbitrary External Encodings" Selected Areas in Cryptography, vol. 4876 of Lecture Notes in Computer Science, pp. 264-277. Springer-Verlag, Aug. 2007.
Wyseur, B., "White-Box Cryptography", Ph. D thesis, Katholieke Universiteit Leuven, Mar. 2009.

* cited by examiner

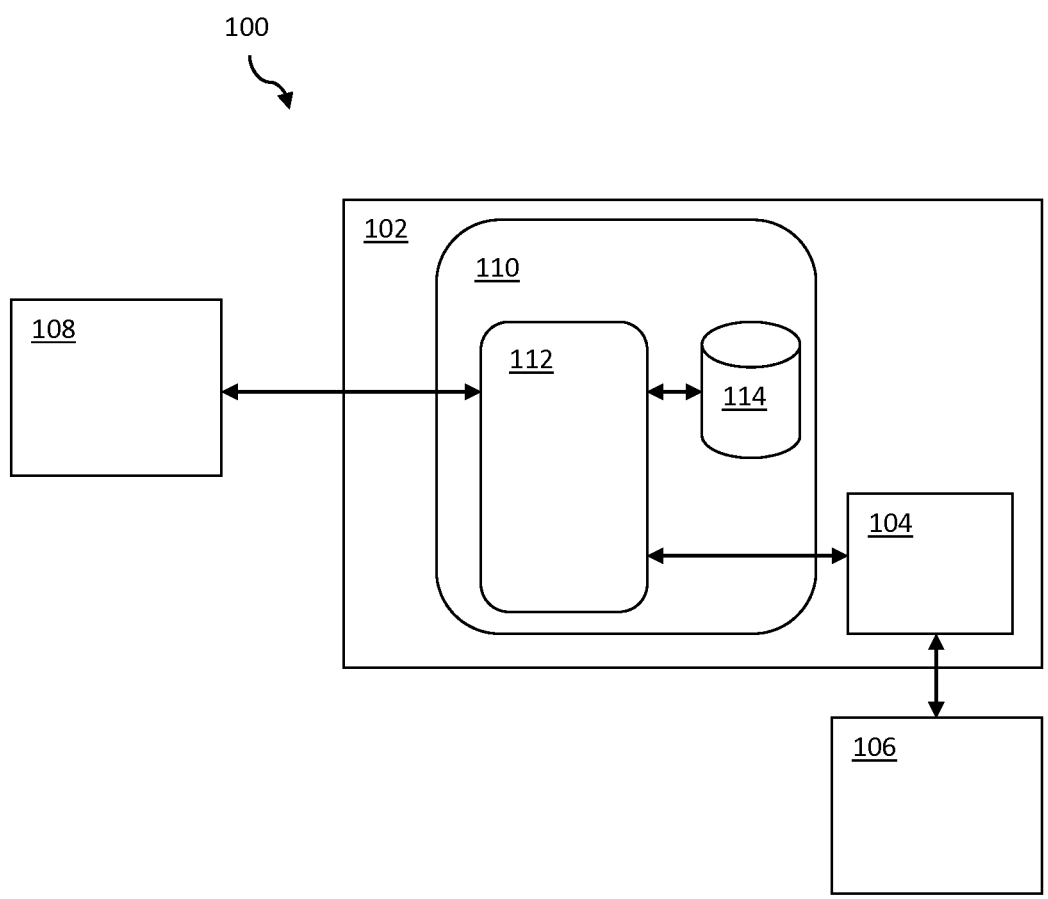

METHOD FOR FACILITATING TRANSACTIONS, COMPUTER PROGRAM PRODUCT AND MOBILE DEVICE

CROSS-REFERENCE TO RELATED APPLICATIONS

This application claims the priority under 35 U.S.C. § 119 of European patent application no. 14170315.7, filed on May 28, 2014, the contents of which are incorporated by reference herein.

FIELD

The present disclosure relates to a method for facilitating transactions carried out by a mobile device. Furthermore, the present disclosure relates to a corresponding computer program product and to a corresponding mobile device for carrying out transactions.

BACKGROUND

In many public transport systems around the world disposable contactless tickets are used for Automatic Fare Collection (AFC). Furthermore, mobile devices such as mobile phones and tablets are capable of providing contactless ticket functionality, for example by means of a built-in smart card integrated circuit (IC), i.e. a so-called Secure Element (SE), or by means of a smart card emulated in software, i.e. through so-called Host Card Emulation (HCE). In the latter case a computer program, which is typically executable by a central processing unit of the mobile device, emulates the functions of a hardware-based smart card IC. The Secure Element may for example be a smart card IC of the SmartMX™ family produced by NXP Semiconductors, which may be connected to a near field communication (NFC) controller IC. A contactless card reader device may communicate with the SE in the mobile device, as if it were communicating with a contactless card which contains exactly such a smart card IC.

Transaction data, in particular ticket data, are typically transmitted to a reader device which is external to the mobile device. This transmission may take place via NFC, for example. Nowadays, many mobile devices contain an NFC interface. NFC technology is compatible with contactless ICs based on the ISO-14443 standard. In HCE, the NFC controller may pass on contactless communication data to an application (app) running on the mobile device and responses generated by this app will be relayed back to the contactless reader by the NFC controller. Instead of communicating with a hardware-based smart card IC, the contactless reader communicates with the computer program that emulates the smart card.

The popularity of HCE has grown compared to hardware-based SEs, because the latter typically require strict and complicated procedures for managing their functionality. Using HCE, a smart card application (app) may be distributed via the usual channel of an app store, such that an end-user may install it. Then ticket data may be distributed to the end-user through other means, for example upon or after receipt of a payment, and be imported in the app. Thus, the app may emulate the actual contactless ticket through HCE.

Instead of importing the ticket data into the app, one could store the actual data in an on-line server and give access credentials to the app, so that the app may access the on-line server and retrieve the ticket data from said server when communicating with the contactless reader. However, this requires an on-line connection which is not always available (for example, underground in a metro station). Besides that, it introduces additional delays in the communication, because all data has to be relayed back and forth to the server. This delay may be relatively small for an individual transaction with the reader, but it can add up significantly and cause actual delays and queues when summed up over the total number of passengers that goes through the gates during rush hours in a large public transport system, for example. It therefore appears to be more attractive to import the ticket data into the app. However, these ticket data typically represent a value—for example a monetary value—which may be subject to either theft, for example through malicious software on the mobile device, or to cloning by the owner of the mobile device.

SUMMARY

There is disclosed a method for facilitating transactions carried out by a mobile device, wherein: the mobile device executes a smart card application; the smart card application receives a cryptographic algorithm from a transaction server external to the mobile device; the smart card application further receives transaction data from said transaction server; the cryptographic algorithm encrypts said transaction data and stores the encrypted transaction data in a storage unit of the mobile device.

In an illustrative embodiment, the cryptographic algorithm retrieves the encrypted transaction data from the storage unit and decrypts the encrypted transaction data, and the smart card application provides the decrypted transaction data to a reader device external to the mobile device.

In a further illustrative embodiment, the smart card application further receives a password from the external reader device, and the cryptographic algorithm takes said password as an input, such that the cryptographic algorithm correctly decrypts the encrypted transaction data only if said password is correct.

In a further illustrative embodiment, the cryptographic algorithm further encrypts the decrypted transaction data again after decrypting the encrypted transaction data and before the smart card application provides the transaction data to the reader device.

In a further illustrative embodiment, the smart card application provides the decrypted transaction data to the reader device via near field communication.

In a further illustrative embodiment, the cryptographic algorithm is implemented as a white-box implementation comprising a series of look-up tables.

In a further illustrative embodiment, at least one of the look-up tables has been compiled using a coding function which takes an identifier of the mobile device as an input.

In a further illustrative embodiment, the transaction data are ticket data or access control data.

Furthermore, there is disclosed a computer program product comprising instructions which, when being executed by a processing unit of a mobile device, carry out or control respective steps of a method of the kind set forth.

Furthermore, there is disclosed a mobile device for carrying out transactions, the mobile device being arranged to execute a smart card application, wherein the smart card application, when being executed by the mobile device, receives a cryptographic algorithm from a transaction server external to the mobile device; wherein the smart card application, when being executed by the mobile device, further receives transaction data from said transaction server; wherein the mobile device is further arranged to execute the cryptographic algorithm and wherein the cryptographic algorithm, when being executed by the mobile device, encrypts said transaction data and stores the encrypted transaction data in a storage unit of the mobile device.

In a further illustrative embodiment, the mobile device is a mobile phone or a tablet device.

In a further illustrative embodiment, the cryptographic algorithm, when being executed by the mobile device, retrieves the encrypted transaction data from the storage unit and decrypts the encrypted transaction data, and the smart card application, when being executed by the mobile device, provides the decrypted transaction data to a reader device external to the mobile device.

In a further illustrative embodiment, the mobile device comprises a near field communication unit for providing the decrypted transaction data to the reader device.

DESCRIPTION OF DRAWINGS

Embodiments will be described in more detail with reference to FIG. 1, which shows an illustrative embodiment of a transaction system in which a method according to the present disclosure may be applied.

DESCRIPTION OF EMBODIMENTS

In accordance with the present disclosure, a contactless smart card may be emulated on an NFC-enabled mobile device. Furthermore, the transaction data may be secured as follows. The mobile device executes a smart card application. The smart card application receives a cryptographic algorithm from an external transaction server. Furthermore, the smart card application receives transaction data from said external transaction server. Then, the cryptographic algorithm encrypts said transaction data and stores the encrypted transaction data in a storage unit of the mobile device.

The transaction data may for example comprise a transport ticket, an entrance ticket or access control data, such as data which are normally carried on a badge. The cryptographic algorithm may be implemented as a white-box implementation comprising a plurality of look-up tables. A white-box implementation typically comprises a series of look-up tables, which complicate the retrieval of secret data hidden or embedded in said implementation. For certain smart card applications these secret data are relatively short-lived. For example, a visitor badge or ticket for public transport or event admittance may be used and checked only once or a few times during a limited period of time. For such secret data a cryptographic algorithm of the kind set forth, in particular a cryptographic algorithm based on a white-box implementation, may offer a relatively efficient, yet sufficiently secure, protection mechanism. Furthermore, since the transaction data are stored securely in a storage unit of the mobile device, no connection with an on-line server is required in order to retrieve such data during a transaction, for example.

FIG. 1 shows an illustrative embodiment of a transaction system 100 in which a method according to the present disclosure may be applied. The transaction system 100 comprises a mobile device 102, a transaction server 108 and a reader device 106. The mobile device 102 may be a mobile phone or a tablet device, for example. The transaction server 108 may be an on-line server in the so-called cloud, for example a ticket server where public transport tickets may be purchased. The reader device 106 may be a device for reading tickets at a metro station or a train station, for example. The mobile device 106 may be arranged to execute a smart card application 110 received from an external application provider (not shown).

In operation, the smart card application 110 may receive—for example by means of a download—transaction data—for example ticket data—from the transaction server 108, as well as a cryptographic algorithm 112. For example, the cryptographic algorithm 112 may be based on a white-box implementation comprising a series of look-up tables. More specifically, the cryptographic algorithm 112 may comprise a software implementation (e.g. a Java class file) of a cryptographic encryption algorithm in the form of a series of lookup tables, as well as a corresponding cryptographic decryption algorithm in the form of a further series of lookup tables. The series of lookup tables that constitutes the encryption algorithm may typically be separate from the series of lookup tables that constitutes the decryption algorithm. It is noted that building white-box implementations is a matter of routine to the skilled person. By means of the series of lookup tables that constitute the encryption algorithm the downloaded transaction data may be encrypted. Subsequently, the cryptographic algorithm may store the encrypted transaction data in a storage unit 114 for later use. The storage unit 114 may be a secure storage unit controlled by the cryptographic algorithm 112. When the transaction data are needed for a transaction, the encrypted transaction data may be retrieved from the storage unit 114 and decrypted by means of the series of lookup tables that constitute the decryption algorithm. Subsequently, the decrypted transaction data may be sent to the external reader device 106 through the NFC unit 104, for example.

Optionally, at least one of the look-up tables has been compiled using a coding function which takes an identifier (ID) of the mobile device as an input, for example a unique serial number of the mobile device. Thereby, node locking may be achieved: the encrypted transaction data are made dependent on the specific mobile device on which they were downloaded (the "node"). Furthermore, the cryptographic algorithm 112 may be specific for a type of transaction data, for example a ticket type, and/or be updated from time to time in order to further enhance the security.

It is noted that instead of immediately decrypting the transaction data, as is the case with Digital Rights Management (DRM) for example, the encrypted transaction data may remain stored in the mobile device until it is needed for carrying out a transaction. The ID-dependent coding function may make the cryptographic functionality device-dependent, such that it may be prevented that the encrypted transaction data, including the functionality to decrypt it, is copied to another (non-authentic) mobile device. That is to say, the functionality to decrypt the stored encrypted transaction data is dependent on the availability of the identifier of the mobile device: the encrypted transaction data may be decrypted correctly only if this identifier is available. In addition, as described below, the decryption functionality may be made dependent on the availability of a specific password.

In a use case, when a contactless reader device communicates with the smart card app, the smart card app causes the cryptographic algorithm to decrypt the requested transaction data and passes it to the reader device.

According to an illustrative embodiment, the reader first presents a password to the app, which may serve as an additional input to the decryption function, i.e. the cryptographic algorithm. Thus, the encrypted transaction data which are stored in the mobile device may only be correctly decrypted if the password is correct. That is to say, without a correct password, the transaction data may effectively be inaccessible.

A possible attack vector is the stealing of decrypted transaction data while it is passed as a message to the contactless, external reader device. This may be done either over-the-air (RF sniffing) or within the mobile device (by malicious software that can inspect the communication pathways inside the device). In order to prevent the latter, according to a further illustrative embodiment, the cryptographic algorithm may further encrypt transaction data to be sent to the external reader device. That is to say, the white-box implementation of the cryptographic algorithm may also be used to encrypt messages that carry transaction data to the external reader device. For this purpose, the cryptographic algorithm may contain a further series of lookup tables. For example, the decryption lookup tables may be concatenated with the encryption lookup tables for this encryption. The receiving side, i.e. the reader device, may use a conventional 'black-box' decryption method for decrypting the received messages. In other words, the decryption of the messages by the reader may—but does not have to be—carried out by means of a white-box implementation of a corresponding decryption algorithm.

As mentioned above, white-box implementations of cryptographic algorithms are known as such. For example, white-box implementations of symmetric block ciphers such as AES and DES are known. Furthermore, it is known how to apply coding functions to the lookup tables which constitute a white-box implementation of a cryptographic algorithm. Most symmetric block ciphers, including AES and DES, are constructed from building blocks that are special mathematical functions called substitution boxes ("S-boxes") and linear transformations. Current white-box implementations represent each component or building block of a block cipher as a series of lookup tables and insert random invertible input- and output encodings between the components to introduce ambiguity. These encodings and corresponding decodings are incorporated into the respective lookup tables so that the resulting white-box implementation of the algorithm appears as a sequence of lookup tables with random values as output and input between the stages of the sequence.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 transaction system
102 mobile device
104 NFC unit
106 reader device
108 transaction server
110 smart card application
112 cryptographic algorithm
114 storage unit

The invention claimed is:

1. A method for facilitating transactions carried out by a mobile device, the method comprising:
   executing, with the mobile device, a smart card application;
   receiving, with the smart card application, a cryptographic algorithm from a transaction server external to the mobile device;
   receiving, with the smart card application, transaction data from said transaction server;
   encrypting, with the cryptographic algorithm, said transaction data, wherein the encrypted transaction data are made dependent on a specific mobile device on which the encrypted transaction data were downloaded by compiling at least one look-up table using a coding function which takes a unique identifier of the specific mobile device as an input and is specific for a particular type of transaction data; and
   storing the encrypted transaction data in a storage unit of the mobile device.

2. The method as claimed in claim 1, further comprising:
   retrieving, with the cryptographic algorithm, the encrypted transaction data from the storage unit;
   decrypting the encrypted transaction data; and
   providing, with the smart card application, the decrypted transaction data to a reader device external to the mobile device.

3. The method as claimed in claim 2, further comprising:
   receiving, with the smart card application, a password from the reader device;
   taking, with the cryptographic algorithm, said password as an input; and
   decrypting, with the cryptographic algorithm, the encrypted transaction data only when said password is correct.

4. The method as claimed in claim 2, further comprising:
   re-encrypting, with the cryptographic algorithm, the decrypted transaction data after the decrypting of the encrypted transaction data and before the smart card application provides the transaction data to the reader device.

5. The method as claimed in claim 2, further comprising:
   providing, with the smart card application, the decrypted transaction data to the reader device via near field communication.

6. The method as claimed in claim 1, wherein the cryptographic algorithm is implemented as a white-box implementation comprising a series of look-up tables.

7. The method as claimed in claim 1, wherein the transaction data are ticket data or access control data.

8. A non-transitory computer-readable medium comprising instructions which, when being executed by a processing unit of a mobile device, carry out or control respective steps of a method for facilitating transactions, the non-transitory computer-readable medium comprising:
- instructions for executing, with the mobile device, a smart card application;
- instructions for receiving, with the smart card application, a cryptographic algorithm from a transaction server external to the mobile device;
- instructions for receiving, with the smart card application, transaction data from said transaction server;
- instructions for encrypting, with the cryptographic algorithm, said transaction data, wherein the encrypted transaction data are made dependent on a specific mobile device on which the encrypted transaction data were downloaded by compiling at least one look-up table using a coding function which takes a unique identifier of the specific mobile device as an input and is specific for a particular type of transaction data; and
- instructions for storing the encrypted transaction data in a storage unit of the mobile device.

9. A mobile device for carrying out transactions, the mobile device being configured to execute a smart card application, wherein the smart card application, when being executed by the mobile device, receives a cryptographic algorithm from a transaction server external to the mobile device and transaction data from said transaction server; and execute the cryptographic algorithm, wherein the cryptographic algorithm, when being executed by the mobile device, encrypts said transaction data, wherein the encrypted transaction data are made dependent on a specific mobile device on which the encrypted transaction data were downloaded by compiling at least one look-up table using a coding function which takes a unique identifier of the specific mobile device as an input and is specific for a particular type of transaction data, and stores the encrypted transaction data in a storage unit of the mobile device.

10. The mobile device as claimed in claim 9, being a mobile phone or a tablet device.

11. The mobile device as claimed in claim 9, wherein the cryptographic algorithm, when being executed by the mobile device, retrieves the encrypted transaction data from the storage unit and decrypts the encrypted transaction data, and wherein the smart card application, when being executed by the mobile device, provides the decrypted transaction data to a reader device external to the mobile device.

12. The mobile device as claimed in claim 11, comprising a near field communication unit for providing the decrypted transaction data to the reader device.

* * * * *